(12) United States Patent
Huang et al.

(10) Patent No.: US 10,948,157 B2
(45) Date of Patent: Mar. 16, 2021

(54) REFLECTOR BOWL AND OPTICAL SYSTEM APPLICABLE FOR COLORFUL SPOTLIGHT

(71) Applicant: GUANGZHOU YAJIANG PHOTOELECTRIC EQUIPMENT CO., LTD., Guangdong (CN)

(72) Inventors: Rongfeng Huang, Guangdong (CN); Zhiman Chen, Guangdong (CN); Guohai Wang, Guangdong (CN); Zesong Yu, Guangdong (CN)

(73) Assignee: GUANGZHOU YAJIANG PHOTOELECTRIC EQUIPMENT CO., LTD., Guangzhou (CN)

( * ) Notice: Subject to any disclaimer, the term of this patent is extended or adjusted under 35 U.S.C. 154(b) by 38 days.

(21) Appl. No.: 16/472,911

(22) PCT Filed: Jul. 19, 2018

(86) PCT No.: PCT/CN2018/096235
§ 371 (c)(1),
(2) Date: Jun. 24, 2019

(87) PCT Pub. No.: WO2020/006783
PCT Pub. Date: Jan. 9, 2020

(65) Prior Publication Data
US 2020/0386385 A1 Dec. 10, 2020

(30) Foreign Application Priority Data
Jul. 4, 2018 (CN) .......................... 201810725624.8

(51) Int. Cl.
*F21S 8/00* (2006.01)
*F21V 3/04* (2018.01)
(Continued)

(52) U.S. Cl.
CPC ................ *F21V 3/04* (2013.01); *F21V 7/045* (2013.01); *G02B 3/08* (2013.01); *F21Y 2115/10* (2016.08)

(58) Field of Classification Search
CPC ........ F21V 3/04; F21V 7/045; F21Y 2115/10; G02B 3/08
(Continued)

(56) References Cited

U.S. PATENT DOCUMENTS

| | | | |
|---|---|---|---|
| 2012/0063146 A1* | 3/2012 | Kawagoe | F21K 9/60 362/294 |
| 2013/0229799 A1* | 9/2013 | Lee | F21K 9/20 362/235 |
| 2013/0313516 A1* | 11/2013 | David | H01L 33/04 257/13 |

FOREIGN PATENT DOCUMENTS

| | | |
|---|---|---|
| CN | 201126152 Y | 10/2008 |
| CN | 201355001 Y | 12/2009 |

(Continued)

*Primary Examiner* — Ali Alavi

(57) ABSTRACT

The invention discloses a reflector bowl and an optical system applicable for colorful spotlights. The reflector bowl comprises a reflector bowl body having a big end and a small end, wherein the small end of the reflector bowl body is arranged with a light source opening and the big end of the reflector bowl body is opened and serves as a light outlet, the reflector bowl body has a square shaped cross section, and an inner surface of the reflector bowl body is a smooth mirror surface. The reflector bowl body is configured to have a square shaped cross section and thus the light outlet has a square shape, and lights are reflected by the reflector bowl body and the reflected lights can be superimposed with direct lights of the light source, whereby the reflector bowl of the invention realizes uniform color mixture on the smooth surface.

6 Claims, 2 Drawing Sheets

(51) Int. Cl.
*F21V 7/04* (2006.01)
*G02B 3/08* (2006.01)
*F21Y 115/10* (2016.01)

(58) Field of Classification Search
USPC ........................................................ 362/97.1
See application file for complete search history.

(56) References Cited

FOREIGN PATENT DOCUMENTS

| CN | 102537847 A | 7/2012 |
| CN | 205581515 U | 9/2016 |
| CN | 206449586 U | 8/2017 |

\* cited by examiner

REFLECTOR BOWL AND OPTICAL SYSTEM APPLICABLE FOR COLORFUL SPOTLIGHT

FIELD OF THE INVENTION

The present invention relates to the technical field of the lighting equipment, more particularly to a reflector bowl and an optical system which is applicable for a colorful spotlight.

BACKGROUND OF THE INVENTION

The reflector bowl is mainly used for concentrating lights of illumination lamps. Light directions may be changed by means of a light-reflecting surface of a reflector bowl, such that lights can be condensed into a light beam in a certain direction. Usually, the light-out surfaces of existing reflector bowls are substantially circular shaped and have high luminous efficiencies. However, such light-out surfaces make non-uniform color mixture and it is impossible to realize seamless joint between reflector bowls.

SUMMARY OF THE INVENTION

In order to overcome existing disadvantages, the present invention provides a reflector bowl and an optical system applicable for colorful spotlights, which not only have high luminous efficiencies, but also realize uniform color mixture on the light-out surface and a gap-free connection of the reflector bowls.

To solve the technical problems, the present invention provides a technical solution.

A reflector bowl comprises a reflector bowl body having a big end and a small end, wherein the small end of the reflector bowl body is arranged with a light source opening and the big end of the reflector bowl body is opened and serves as a light outlet, wherein the reflector bowl body has a square shaped cross section, and an inner surface of the reflector bowl body is a smooth mirror surface.

Preferably, a side length of the big end of the reflector bowl body, a side length of the small end and a height of the reflector bowl body satisfy the relational expression $$b \geq \frac{a}{3} + \frac{\sqrt{4*a^2 + h^2}}{3},$$

wherein a refers to the half of the side length of the small end of the reflector bowl body, b refers to the half of the side length of the big end of the reflector bowl body, and h refers to the height of the reflector bowl body.

Preferably, the two reflector bowl bodies may be connected together to form one joint body, wherein the light outlets of the two reflector bowl bodies of the joint body lie in the same plane, and two ends of the joint body are arranged with joint parts for connection of the joint body.

Preferably, the joint parts may be a concave joint part and a convex joint part.

Preferably, the concave joint part and the convex joint part may be alternately arranged, and the concave joint part and the convex joint part of one joint body correspond to the convex joint part and the concave joint part of another joint body, respectively.

An optical system applicable for a colorful spotlight comprises a reflector bowl, a colorful LED light source, an atomization piece, and a light-out Fresnel lens, wherein the colorful LED light source is disposed in the light source opening of the reflector bowl, the light-out Fresnel lens is disposed at the light outlet of the reflector bowl, and the atomization piece is disposed between the light-out Fresnel lens and the light outlet.

Preferably, the atomization piece may be a diffuser film having an angle.

The present invention has advantages as follows. The reflector bowl body is configured to have a square shaped cross section and thus the light outlet has a square shape, and lights are reflected by the reflector bowl body and the reflected lights can be superimposed with direct lights of the light source, whereby uniform color mixture can be realized on the smooth surface. Meanwhile, since the inner surface of the reflector bowl body is a smooth mirror surface, high luminous efficiency is ensured. The present invention has a simple structure, good using effect and is easy to be generalized.

Figure 1:
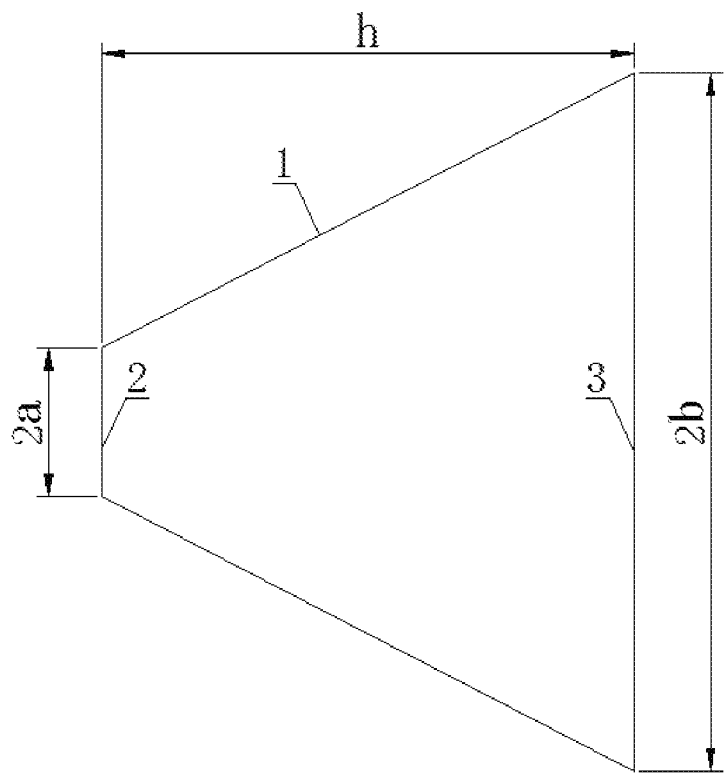
FIG. 1 is a schematic drawing of a reflector bowl according to the present invention.

In the drawings: 1. reflector bowl body; 2. light source opening; 3. light outlet; 4. joint body; 5. concave joint part; 6. convex joint part; 7. colorful LED light source; 8. atomization piece; 9. light-out Fresnel lens.

DETAILED DESCRIPTION OF ILLUSTRATED EMBODIMENTS

The present invention will be further explained below in detail with reference to the drawings and embodiments. The described embodiments are intended to be illustrative rather than limiting. The present invention is intended to cover all embodiments obtained by those skilled in the art without involving any creative work based on the embodiments described in the present invention.

Referring to FIG. 1, a reflector bowl in the present embodiment comprises a reflector bowl body 1 having a big end and a small end, wherein the small end of the reflector bowl body 1 is arranged with a light source opening 2 and the big end of the reflector bowl body 1 is opened and serves as a light outlet 3, wherein the reflector bowl body 1 has a square shaped cross section, and an inner surface of the reflector bowl body 1 is a smooth mirror surface.

In the reflector bowl with the above technical features, the reflector bowl body 1 is configured to have a square shaped cross section and thus the light outlet 3 has a square shape, and lights are reflected by the reflector bowl body 1 and the reflected lights can be superimposed with direct lights of the light source, whereby uniform color mixture can be realized on the smooth surface. Meanwhile, due to the inner surface of the reflector bowl body 1 which is a smooth mirror surface, high luminous efficiency is ensured. The present invention has a simple structure, good using effect and is easy to be generalized.

In the present embodiment, the side length of the big end of the reflector bowl body 1, the side length of the small end and the height of the reflector bowl body 1 satisfy the relational expression of $$b \geq \frac{a}{3} + \frac{\sqrt{4*a^2 + h^2}}{3},$$

wherein a equals to the half of the side length of the small end of the reflector bowl body, b equals to the half of the side length of the big end of the reflector bowl body, and h refers to the height of the reflector bowl body. In the case that the side length of the big end of the reflector bowl body 1, the side length of the small end and the height of the reflector bowl body 1 satisfy the above relationship, the lights which are emitted from the light source disposed at the light source opening 2 are reflected inside the reflector bowl body 1 only once. Lights are reflected by the reflector bowl body 1 and the reflected lights can be superimposed with direct lights of the light source, thereby realizing uniform color mixture on the smooth surface. Furthermore, the cross-sectional surface of the reflector bowl body 1 is consisted of straight lines and the reflector bowl body 1 is easy to manufacture.

Figure 2:
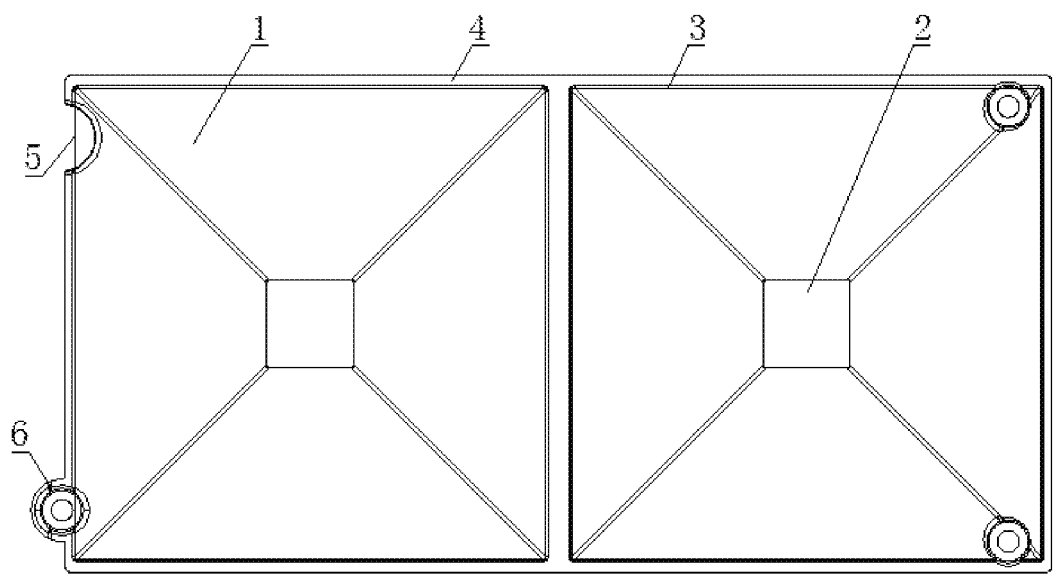
FIG. 2 is a schematic drawing of a joint body of a reflector bowl according to the present invention.

Referring to FIG. 2, the two reflector bowl bodies 1 in the present embodiment may be connected together to form one joint body 4, wherein the light outlets 3 of the two reflector bowl bodies 1 of the joint body 4 lie in the same plane, and two ends of the joint body 4 are arranged with joint parts for connection of the joint body 4. When it is necessary to connect the reflector bowls, the reflector bowls may be manufactured into the joint body 4, and then a connection of the joint body 4 can be realized by the joint parts arranged at two ends of the joint body 4. Such operation is simple and convenient.

Herein, the joint parts may be a concave joint part 5 and a convex joint part 6 which are alternately arranged, and the concave joint part 5 and the convex joint part 6 of one joint body 4 correspond to the convex joint part 6 and the concave joint part 5 of another joint body 4, respectively. Since the joint bodies 4 are arranged with convex joint parts 6 and concave joint parts 5 corresponding with each other, a gap-free connection of the joint bodies 4 can be realized. That is, a gap-free connection of the reflector bowls can be realized.

Figure 3:
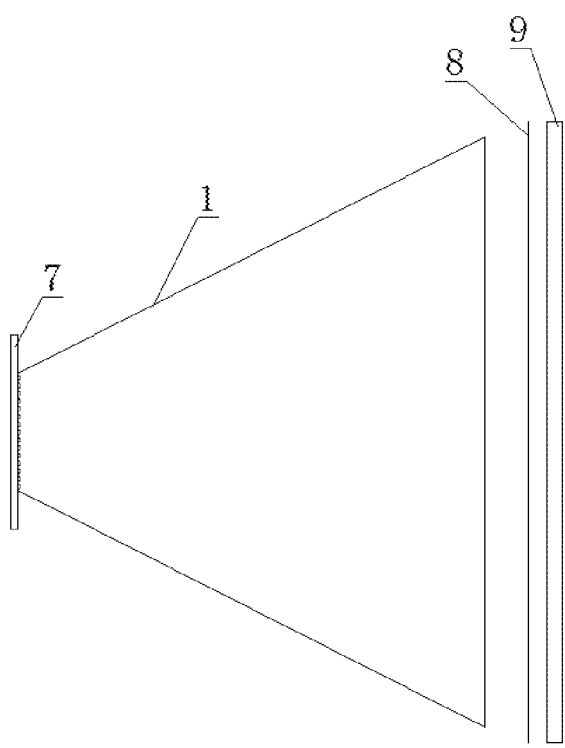
FIG. 3 is a schematic drawing of an optical system applicable for a colorful spotlight according to the present invention.

Referring to FIG. 3, an optical system applicable for a colorful spotlight comprises a reflector bowl according to the embodiment, a colorful LED light source 7, an atomization piece 8, and a light-out Fresnel lens 9, wherein the colorful LED light source 7 is disposed in the light source opening 2 of the reflector bowl, the light-out Fresnel lens 9 is disposed at the light outlet 3 of the reflector bowl, and the atomization piece 8 is disposed between the light-out Fresnel lens 9 and the light outlet 3.

Herein, in actual practice, it is necessary to make sure that the focus of the light-out Fresnel lens 9 lies exactly on the colorful LED light source 7 so as to image the colorful LED light source 7. The atomization piece 8 may be a diffuser film with an angle, and the actual angle may be determined according to specific needs.

In the optical system applicable for colorful spotlights provided in the present embodiment, the lights on the light-out surface of the system, which include direct lights of the colorful LED light source 7 and the lights of the colorful LED light source 7 reflected by the reflector bowl and superimposed therewith, form a square shaped light spot with uniform color mixture on the light-out surface. Furthermore, in the case that a plurality of systems are combined, each group of colorful LED light source 7 can be individually controlled and pixel point effect can be realized.

All the above are merely preferred embodiments of the present invention. It should be noted that, the present invention is intended to cover various modifications and equivalent arrangements obtained by those skilled in the art without departing from the technical principle of the present invention.

The invention claimed is:

1. A reflector bowl, characterized in that, the reflector bowl comprises a reflector bowl body having a big end and a small end, wherein the small end of the reflector bowl body is arranged with a light source opening and the big end of the reflector bowl body is opened and serves as a light outlet, wherein the reflector bowl body has a square shaped cross section, and an inner surface of the reflector bowl body is a smooth mirror surface; wherein two reflector bowl bodies are connected together to form one joint body, the light outlets of the two reflector bowl bodies of the joint body lie in the same plane, and two ends of the joint body are arranged with a joint part for connection of the joint body, the joint parts are a concave joint part and a convex joint part, the concave joint part and the convex joint part are alternately arranged, and the concave joint part and the convex joint part of one joint body correspond to the convex joint part and the concave joint part of another joint body.

2. The reflector bowl according to claim 1, characterized in that, a side length of the big end of the reflector bowl body, a side length of the small end and a height of the reflector bowl body satisfy the relational expression $$b \geq \frac{a}{3} + \frac{\sqrt{4*a^2 + h^2}}{3},$$

wherein a refers to the half of the side length of the small end of the reflector bowl body, b refers to the half of the side length of the big end of the reflector bowl body, and h refers to the height of the reflector bowl body.

3. An optical system applicable for a colorful spotlight, characterized in that, the optical system comprises a reflector bowl according to claim 2, a colorful LED light source, an atomization piece, and a light-out Fresnel lens, wherein the colorful LED light source is disposed in the light source opening of the reflector bowl, the light-out Fresnel lens is disposed at the light outlet of the reflector bowl, and the atomization piece is disposed between the light-out Fresnel lens and the light outlet.

4. The optical system applicable for the colorful spotlight according to claim 3, characterized in that, the atomization piece is a diffuser film with an angle.

5. An optical system applicable for a colorful spotlight, characterized in that, the optical system comprises a reflector bowl according to claim 1, a colorful LED light source, an atomization piece, and a light-out Fresnel lens, wherein the colorful LED light source is disposed in the light source opening of the reflector bowl, the light-out Fresnel lens is disposed at the light outlet of the reflector bowl, and the atomization piece is disposed between the light-out Fresnel lens and the light outlet.

6. The optical system applicable for the colorful spotlight according to claim 5, characterized in that, the atomization piece is a diffuser film with an angle.

* * * * *